US011256962B2

(12) United States Patent
Biswas et al.

(10) Patent No.: US 11,256,962 B2
(45) Date of Patent: Feb. 22, 2022

(54) WEAKLY SUPERVISED LEARNING OF 3D HUMAN POSES FROM 2D POSES

(71) Applicant: Tata Consultancy Services Limited, Mumbai (IN)

(72) Inventors: Sandika Biswas, Kolkata (IN); Sanjana Sinha, Kolkata (IN); Kavya Gupta, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 233 days.

(21) Appl. No.: 16/815,206

(22) Filed: Mar. 11, 2020

(65) Prior Publication Data

US 2020/0342270 A1 Oct. 29, 2020

(30) Foreign Application Priority Data

Apr. 26, 2019 (IN) .............................. 201921016770

(51) Int. Cl.
*G06K 9/00* (2006.01)
*G06K 9/62* (2022.01)
*G06N 3/08* (2006.01)

(52) U.S. Cl.
CPC ....... *G06K 9/6264* (2013.01); *G06K 9/00208* (2013.01); *G06K 9/00369* (2013.01); *G06K 9/6259* (2013.01); *G06N 3/08* (2013.01)

(58) Field of Classification Search
CPC .......... G06K 9/66; G06K 9/4628; G06K 9/32; G06K 9/2013; G06K 9/344; G06K 9/6264;

(Continued)

(56) References Cited

U.S. PATENT DOCUMENTS 7,212,665 B2 * 5/2007 Yang .................. G06K 9/00362
382/159
8,577,154 B2 * 11/2013 Nevatia ................ G06K 9/4642
382/209

(Continued)

OTHER PUBLICATIONS

Pavllo, D. et al. "3D human pose estimation in video with temporal convolutions and semi-supervised training," retrieved from https://arxiv.org/pdf/1811.11742.pdf. (13 pages).

(Continued)

*Primary Examiner* — Amir Alavi
(74) *Attorney, Agent, or Firm* — Finnegan, Henderson, Farabow, Garrett & Dunner LLP

(57) ABSTRACT

Estimating 3D human pose from monocular images is a challenging problem due to the variety and complexity of human poses and the inherent ambiguity in recovering depth from single view. Recent deep learning based methods show promising results by using supervised learning on 3D pose annotated datasets. However, the lack of large-scale 3D annotated training data makes the 3D pose estimation difficult in-the-wild. Embodiments of the present disclosure provide a method which can effectively predict 3D human poses from only 2D pose in a weakly-supervised manner by using both ground-truth 3D pose and ground-truth 2D pose based on re-projection error minimization as a constraint to predict the 3D joint locations. The method may further utilize additional geometric constraints on reconstructed body parts to regularize the pose in 3D along with minimizing re-projection error to improvise on estimating an accurate 3D pose.

12 Claims, 9 Drawing Sheets

(58) Field of Classification Search
CPC ........... G06K 9/00208; G06K 9/00369; G06K 9/6259; G06T 7/0022; G06T 7/0075; G06T 7/0028; G06T 7/0026; G06T 7/0024; G06T 7/0034; G06T 2207/10012; H04N 13/0239; H04N 13/0082
See application file for complete search history.

(56) References Cited

U.S. PATENT DOCUMENTS

| | | | | |
|---|---|---|---|---|
| 8,958,600 | B2* | 2/2015 | Othmezouri | G06T 7/251 |
| | | | | 382/103 |
| 10,380,788 | B2* | 8/2019 | Martinez | G06T 7/55 |
| 10,467,791 | B2* | 11/2019 | Noh | G06F 3/04847 |
| 10,853,970 | B1* | 12/2020 | Akbas | G06T 7/73 |
| 10,929,654 | B2* | 2/2021 | Iqbal | G06K 9/00375 |
| 11,069,131 | B2* | 7/2021 | Agrawal | G06T 15/80 |
| 11,069,150 | B2* | 7/2021 | Sminchisescu | G06T 17/20 |
| 11,074,717 | B2* | 7/2021 | Tremblay | G06N 3/08 |
| 2019/0303677 | A1* | 10/2019 | Choutas | G06K 9/00718 |
| 2020/0342270 | A1* | 10/2020 | Biswas | G06T 7/70 |

OTHER PUBLICATIONS

Wandt, B. et al. "RepNet: Weakly Supervised Training of an Adversarial Reprojection Network for 3D Human Pose Estimation," retrieved from https://arxiv.org/pdf/1902 09868.pdf. (10 pages).

Kanazawa, A. et al. "End-to-end Recovery of Human Shape and Pose," retrieved from http.//files.is.tue.mpg.de/black/papers/kanazawaCVPR2018.pdf. (10 pages).

Drover, D. et al. "Can 3D Pose be Learned from 2D Projections Alone?" retrieved from https://arxiv.org/pdf/1808.07182 pdf. (17 pages).

Mehta, D. et al. "Single-Shot Multi-Person 3D Pose Estimation From Monocular RGB," retrieved from https://www.semanticscholar.org/paper/Single-Shot-Multi-Person-3D-Body-Pose-Estimation-Mehta-Sotnychenko/c96bd1a584d0e5d86148cfcab0f573825bc3fb56. (17 pages).

* cited by examiner

WEAKLY SUPERVISED LEARNING OF 3D HUMAN POSES FROM 2D POSES

PRIORITY CLAIM

This U.S. patent application claims priority under 35 U.S.C. § 119 to: India Application No. 201921016770, filed on Apr. 26, 2019. The entire contents of the aforementioned application are incorporated herein by reference.

TECHNICAL FIELD

The disclosure herein generally relates to pose estimation techniques, and, more particularly, to weakly supervised learning of 3D human poses from 2D poses.

BACKGROUND

Human pose estimation from images and videos is a fundamental problem in computer vision which has a variety of applications such as virtual reality, gaming, surveillance, human computer interaction, health-care etc. Estimating the shape of the human skeleton in 3D from a single image or video is a much more challenging problem than estimating the pose in 2D due to the inherent ambiguity of estimating depth from a single view. Due to the availability of large scale 2D pose annotated datasets, the state-of-the-art deep supervised learning based methods for 2D pose estimation have successfully been able to generalize to new images that are captured "in-the-wild". These are the images that occur naturally, i.e., they are not captured under any specific scene settings or pose restrictions. However, the well-known 3D pose datasets contain 3D motion capture data recorded in controlled setup in indoor settings. Hence, 3D supervised learning methods, do not generalize well to datasets in the wild where 3D ground truth is not present.

Almost all the recent methods for monocular 3D pose estimation from images fall under one of these three approaches—(i) Estimating 3D pose from raw images directly using full 3D supervision, (ii) Estimating 3D pose from 2D ground-truth pose using full 3D supervision (iii) Estimating 3D pose directly from images using weakly-supervised learning. Approach (ii) has been shown to be more effective than approach (i), since the 2D pose input makes the process of 3D pose estimation invariant to image-related factors such as illumination, background, occlusion etc. which adversely affect the overall accuracy of 3D pose estimation. Though both the approaches (i) and (ii) produce very high accuracy on the popular 3D benchmark datasets which are captured under controlled settings, but may fail to generalize well if the pose or scene is very different from 3D training examples. On the other hand, weakly supervised methods use 2D pose ground-truth from 2D pose datasets as weak labels in addition to the 3D pose ground truth from 3D pose datasets. Since 2D datasets contain poses in the wild, the generalization of these methods is higher than the fully-supervised methods (approaches in (i) and (ii)). However, the current methods of weakly-supervised learning is carried out on images as a two-step approach by first predicting 2D poses and then regressing joint depth in a single end-to-end network. Training a network using such an approach is crucially dependent on the accuracy of the 2D pose detector and hence, the training may go wrong if the learnt 2D poses are inaccurate. The accuracy of 2D pose estimation suffers in these methods due to end-to-end 3D pose and 2D estimation simultaneously using depth regression. FIG. 2 shows an example where a weakly supervised approach, which compute 2D pose and 3D pose jointly, produces incorrect joint locations due to incorrect estimation of intermediate 2D pose during training.

SUMMARY

Embodiments of the present disclosure present technological improvements as solutions to one or more of the above-mentioned technical problems recognized by the inventors in conventional systems. For example, in one aspect, there is provided a processor implemented method for weakly supervised learning of 3D human poses from 2D poses. The method comprises receiving, via one or more hardware processors, an input two dimensional (2D) pose ($Y_{2d}$) corresponding to a user, wherein the input 2D pose comprises human joint positions in 2D image coordinates; predicting, via a neural network executed by the one or more hardware processors, a three dimensional (3D) pose ($\hat{Y}_{3d}$) using the input 2D pose ($Y_{2d}$), wherein the three dimensional (3D) pose ($\hat{Y}_{3d}$) comprises the human joint positions in a 3D space; estimating, via the neural network via a neural network executed by the one or more hardware processors, a re-projected 2D pose ($\hat{Y}_{2d}^{reproj}$) from the predicted 3D pose ($\hat{Y}_{3d}$) by minimizing a 2D re-projection loss, wherein the 2D re-projection loss is computed by aligning the re-projected 2D pose ($\hat{Y}_{2d}^{reproj}$) to the input 2D pose; and determining, using the re-projected 2D pose ($\hat{Y}_{2d}^{reproj}$), the predicted 3D pose ($\hat{Y}_{3d}$) as an estimated 3D pose, or an optimized 3D pose based on an availability of a 3D ground-truth pose $Y_{3d}$, wherein the predicted 3D pose is fine-tuned to obtain the optimized 3D pose based on the availability of the 3D ground-truth pose $Y_{3d}$.

In an embodiment, the 3D pose ($\hat{Y}_{3d}$) is predicted in a weakly-supervised learning framework using a dataset comprising samples with 2D-3D ground-truth pose pairs.

In another embodiment, the 3D pose ($\hat{Y}_{3d}$) is predicted in a weakly-supervised learning framework using a dataset comprising samples with (i) 2D-3D ground-truth pose pairs and (ii) 2D ground-truth pose.

In an embodiment, a 3D regression loss is computed by aligning the predicted 3D pose ($\hat{Y}_{3d}$) to the 3D ground truth pose.

In another aspect, a system for weakly supervised learning of 3D human poses from 2D poses is provided. The system comprises: a memory storing instructions; one or more communication interfaces; and one or more hardware processors coupled to the memory via the one or more communication interfaces, wherein the one or more hardware processors are configured by the instructions to: receive an input two dimensional (2D) pose ($Y_{2d}$) corresponding to a user, wherein the input 2D pose comprises human joint positions in 2D image coordinates; predict, via a neural network comprised in the system, a three dimensional (3D) pose ($\hat{Y}_{3d}$) using the input 2D pose ($Y_{2d}$), wherein the three dimensional (3D) pose ($\hat{Y}_{3d}$) comprises the human joint positions in a 3D space; estimate, via the neural network, a re-projected 2D pose ($\hat{Y}_{2d}^{reproj}$) from the predicted 3D pose ($\hat{Y}_{3d}$) by minimizing a 2D re-projection loss, wherein the 2D re-projection loss is computed by aligning the re-projected 2D pose ($\hat{Y}_{2d}^{reproj}$) to the input 2D pose; and determine, using the re-projected 2D pose ($\hat{Y}_{2d}^{reproj}$), the predicted 3D pose ($\hat{Y}_{3d}$) as an estimated 3D pose, or an optimized 3D pose based on an availability of a 3D ground-truth pose $Y_{3d}$, wherein the predicted 3D pose is fine-tuned to obtain the optimized 3D pose based on the availability of the 3D ground-truth pose $Y_{3d}$.

In an embodiment, the 3D pose ($\hat{Y}_{3d}$) is predicted in a weakly-supervised learning framework using a dataset comprising samples with 2D-3D ground-truth pose pairs.

In another embodiment, the 3D pose ($\hat{Y}_{3d}$) is predicted in a weakly-supervised learning framework using a dataset comprising samples with (i) 2D-3D ground-truth pose pairs and (ii) 2D ground-truth pose.

In an embodiment, a 3D regression loss is computed by aligning the predicted 3D pose ($\hat{Y}_{3d}$) to the 3D ground truth pose.

In yet another aspect, there are provided one or more non-transitory machine readable information storage mediums comprising one or more instructions which when executed by one or more hardware processors cause weakly supervised learning of 3D human poses from 2D poses by receiving, via one or more hardware processors, an input two dimensional (2D) pose ($Y_{2d}$) corresponding to a user, wherein the input 2D pose comprises human joint positions in 2D image coordinates; predicting, via a neural network executed by the one or more hardware processors, a three dimensional (3D) pose ($\hat{Y}_{3d}$) using the input 2D pose ($Y_{2d}$), wherein the three dimensional (3D) pose ($\hat{Y}_{3d}$) comprises the human joint positions in a 3D space; estimating, via the neural network via a neural network executed by the one or more hardware processors, a re-projected 2D pose ($\hat{Y}_{2d}^{reproj}$) from the predicted 3D pose ($\hat{Y}_{3d}$) by minimizing a 2D re-projection loss, wherein the 2D re-projection loss is computed by aligning the re-projected 2D pose ($\hat{Y}_{2d}^{reproj}$) to the input 2D pose; and determining, using the re-projected 2D pose ($\hat{Y}_{2d}^{reproj}$), the predicted 3D pose ($\hat{Y}_{3d}$) as an estimated 3D pose, or an optimized 3D pose based on an availability of a 3D ground-truth pose $Y_{3d}$, wherein the predicted 3D pose is fine-tuned to obtain the optimized 3D pose based on the availability of the 3D ground-truth pose $Y_{3d}$.

In an embodiment, the 3D pose ($\hat{Y}_{3d}$) is predicted in a weakly-supervised learning framework using a dataset comprising samples with 2D-3D ground-truth pose pairs.

In another embodiment, the 3D pose ($\hat{Y}_{3d}$) is predicted in a weakly-supervised learning framework using a dataset comprising samples with (i) 2D-3D ground-truth pose pairs and (ii) 2D ground-truth pose.

In an embodiment, a 3D regression loss is computed by aligning the predicted 3D pose ($\hat{Y}_{3d}$) to the 3D ground truth pose.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments of the present disclosure address the following technical problem—given ground-truth 2D poses in the wild, can 3D poses be recovered with sufficient accuracy even in the absence of 3D ground truth? Embodiments of the present disclosure implement systems and methods that use a simple deep network that consists of a 2D-to-3D pose regression module and a 3D-to-2D pose re-projection module. The advantage of using the network as implemented by the present disclosure is that it can be simultaneously trained on data from both 3D and 2D pose datasets, i.e., even on training samples which lack 3D ground truth. The 2D-to-3D pose regression module is implemented for learning in weakly-supervised framework instead of being fully supervised and b) it can be trained on any dataset containing only ground-truth 2D labels.

Figure 1:
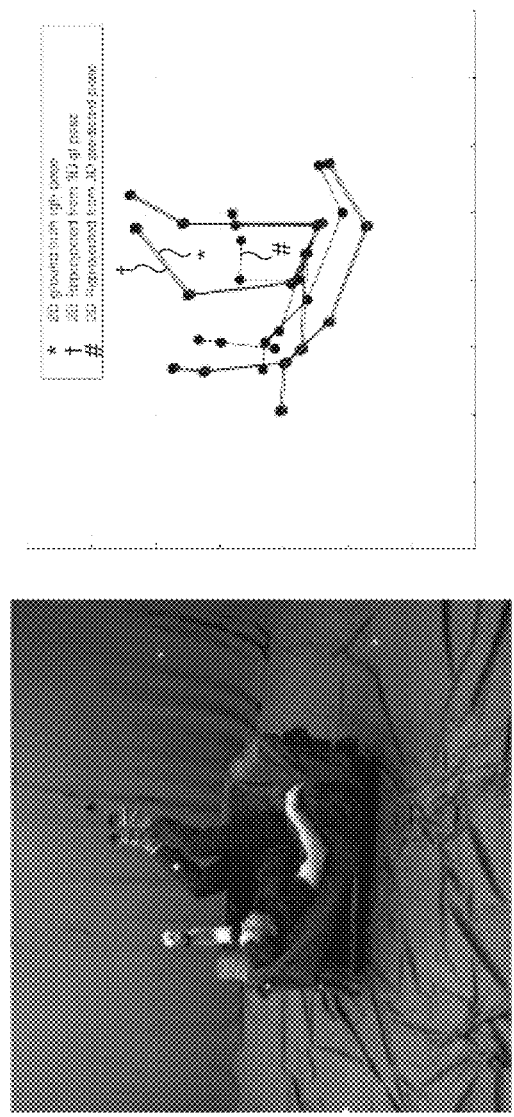
FIG. 1 illustrates a conventional fully supervised method for pose estimation.
Figure 2:
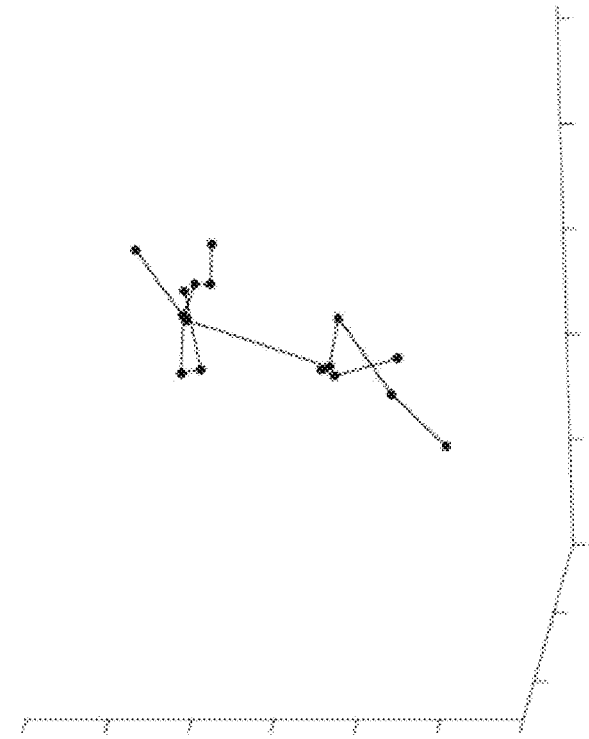
FIG. 2 shows a conventional weakly supervised approach, which computes 2D pose and 3D pose jointly, and produces incorrect joint locations due to incorrect estimation of intermediate 2D pose during training.
Figure 2:
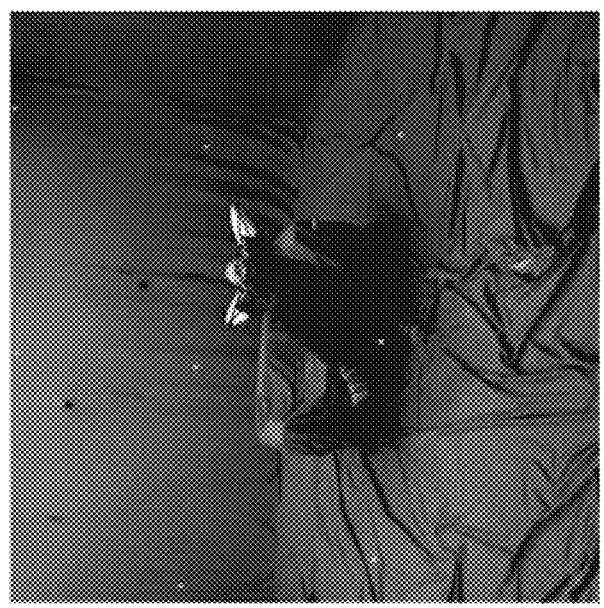

Further, the 3D-to-2D pose re-projection module as implemented by the present disclosure is designed to ensure that the predicted 3D pose re-projects correctly to input 2D poses, which is not ensured by the existing fully supervised method as shown in FIG. 1. In the absence of ground truth 3D pose, the predicted 3D pose is constrained in the present disclosure and its method by minimization of re-projection error with respect to the 2D pose input. The 3D-to-2D regression network of the present disclosure does not require the knowledge of camera parameters and hence can be used on arbitrary images without known camera parameters (e.g., images from MPII dataset). This simple approach of "lifting" 2D pose to 3D and subsequently re-projecting 3D to 2D enables joint training on in-the-wild 2D pose datasets that do not contain 3D pose ground-truth. The approach of the present disclosure differs from other weakly-supervised methods for 3D pose estimation as they do not address the problem of 2D pose estimation and focus only on the effective learning of 3D poses from ground truth 2D poses, which do not contain 3D pose labels.

There are a few related works in pose estimations for instance, Monocular 3D human pose estimation, 2D pose to 3D pose, Weakly-supervised learning of 3D pose, and In-the-wild 3D pose. The monocular 3D human pose estimation problem is to learn the 3D structure of a human skeleton from a single image or a video, without using depth information or multiple views. It is a severely ill-posed problem which has been formulated as a supervised learning problem given the availability of 3D human motion capture datasets. Most of the current works focus on end-to-end 3D pose estimation from single images, while some utilize temporal sequences for estimating 3D pose from video. The present disclosure focuses on the problem of 3D pose estimation from a single image, which can be applicable for videos, but without utilizing any temporal information.

Further, recent research works have approached the problem of estimating 3D poses from 2D poses, which are learned apriori from images. These methods use 2D pose detections from state-of-the-art 2D pose detector, which provides invariance to illumination changes, background clutter, clothing variation, etc. By decoupling the two stages, it is also possible to infer the accuracy of "lifting" ground truth 2D poses to 3D. The current state-of-the art uses a deep feedforward network that takes 2D human pose as input and estimates 3D pose with very high accuracy using a simple network. Their results suggest the effectiveness of decoupling the 3D pose estimation problem into two separate problems—namely, 2D pose estimation from image and 3D pose estimation from 2D poses. In this prior art, the 3D pose detector trained on ground-truth 3D poses achieved a remarkable improvement in accuracy (30%), leading to the implication that the accuracy of 2D pose estimation remains a bottleneck in end-to-end 3D pose estimation.

The present disclosure addresses this problem of learning 3D poses from known 2D poses of high accuracy. However, the fully supervised method of exiting research work can fail to accurately recover 3D pose from ground truth 2D poses if the poses are considerably different from Human3.6m training examples, or contain occluded or cropped human poses. This has led the present disclosure to address the problem of effectively learning 3D poses from 2D pose data with greater pose diversity than the existing 3D pose datasets.

Another conventional approach as mentioned above is Weakly-supervised learning of 3D pose. In this approach, 2D pose datasets were used for 3D pose estimation for simultaneous 2D and 3D pose prediction and weakly supervised learning of 3D poses from images. In the absence of 3D ground truth labels, the method can predict a number of 3D poses, which when projected back gives the same pose in 2D, hence the 3D poses must follow geometric validity constraints, such as bone length ratio, illegal angle constraints and the like. However, current approaches for weakly-supervised learning work directly on images. Hence the accuracy of the predicted 3D pose is affected by the accuracy of the 2D pose learnt in intermediate stages of the network. Hence it is difficult to identify whether 3D pose failure on an arbitrary image is due to noisy estimate of 2D pose or in inaccurate "lifting" of 2D poses to 3D. To this context, the present disclosure implements systems and methods that carry out the weakly-supervised learning directly on 2D poses instead of only images, to investigate the accuracy of learning 3D poses from ground-truth 2D pose in uncontrolled environments.

Another existing approach is "In-the-wild 3D pose": In this approach, widely used 3D pose benchmark datasets Human3.6m and HumanEva were captured using MoCap systems in controlled lab environments and do not contain sufficient pose variability and scene diversity. On the other hand, datasets such as MPII contain large scale in-the-wild data with ground truth annotations for 2D pose obtained from crowd sourcing. This has led to a greater success of 2D pose estimation methods that are capable of generalization to the in-the-wild images. 3D pose estimation methods that utilize these 2D pose datasets for weak-supervision can only be assessed in a qualitative manner. Recently a more challenging 3D pose dataset MPI-INF-3DHP was introduced for more generalized 3D human pose estimation, as it contains some "in-the-wild" 3D pose training examples. The present disclosure has used this dataset to demonstrate generalization of the described method herein.

Referring now to the drawings, and more particularly to FIGS. 3 through 9, where similar reference characters denote corresponding features consistently throughout the figures, there are shown preferred embodiments and these embodiments are described in the context of the following exemplary system and/or method.

Figure 3:
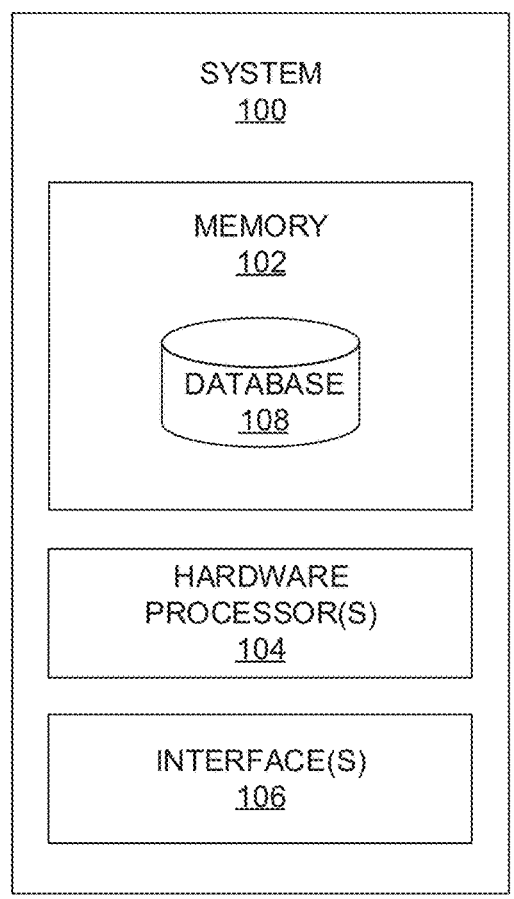
FIG. 3 illustrates an exemplary block diagram of a system for weakly supervised learning of 3D human poses from 2D poses, in accordance with an embodiment of the present disclosure.

FIG. 3 illustrates an exemplary block diagram of a system 100 for weakly supervised learning of 3D human poses from 2D poses, in accordance with an embodiment of the present disclosure. The system 100 may also be referred as 'pose estimation system' or 'pose estimation and learning system' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise information, for example, audio files comprising conversation between multiple users/stakeholders, and the like. In an embodiment, the memory 102 may store (or stores) one or more techniques(s) (e.g., weakly supervised learning framework/technique(s)), 2D poses, predicted 3D poses (also referred as 'three dimensional (3D) pose ($\hat{Y}_{3d}$)'), re-projected 2D pose ($\hat{Y}_{2d}^{reproj}$), 2D re-projection loss(es), 3D regression loss(es), estimated 3D pose(s), optimized 3D pose(s), 3D ground-truth pose $Y_{3d}$, 2D-3D ground-truth pose pairs and (ii) 2D ground-truth pose, and the like. The above techniques which when executed by the one or more hardware processors 104 perform the methodology described herein. The memory 102 further comprises (or may further comprise) information pertaining to input(s)/output(s) of each step performed by the systems and methods of the present disclosure. More specifically, information pertaining to pose prediction and estimation thereof, re-projection, loss minimization, and the like using weakly supervised learning framework(s), and the like may be stored in the memory 102.

Figure 4:
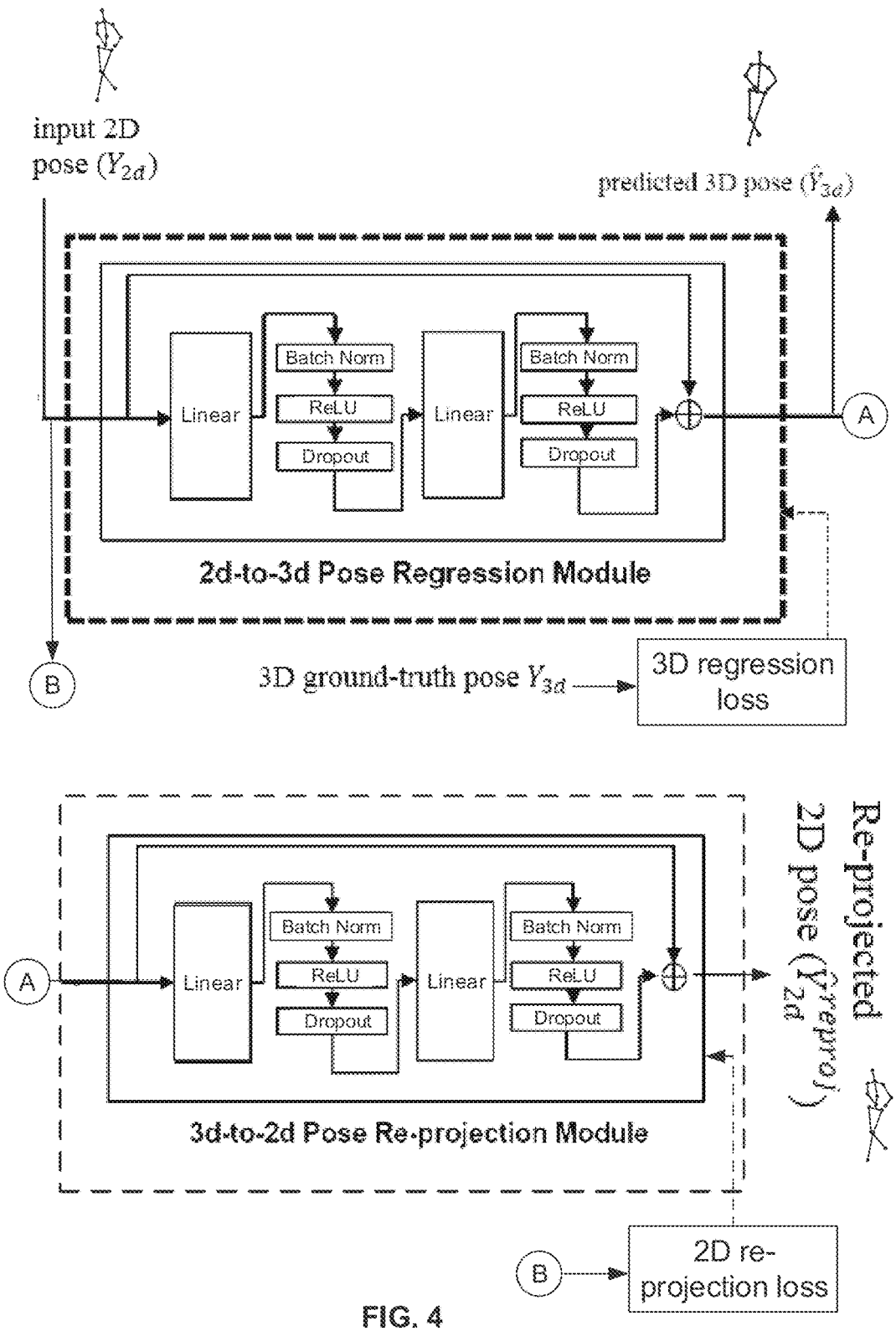
FIG. 4 illustrates an exemplary network architecture comprised in the system of FIG. 3 for weakly supervised learning of 3D human poses from 2D poses, in accordance with an embodiment of the present disclosure.

FIG. 4, with reference to FIG. 3, illustrates an exemplary network architecture comprised in the system 100 of FIG. 3 for weakly supervised learning of 3D human poses from 2D poses, in accordance with an embodiment of the present disclosure. The goal/objective of the present disclosure and its systems and methods is to learn the 3D human pose $Y_{3d} \in \mathbb{R}^{3 \times J}$ (a set of J body joint locations in 3-dimensional space), given the 2D pose Y2D $2Y_{2d} \in \mathbb{R}^{2 \times J}$ in 2-dimensional image coordinates. The 3D pose is learnt in a weakly-supervised manner from a dataset having samples with 2D-3D ground-truth pose pairs ($Y_{2d}$; $Y_{2d}$) as well as samples with only 2D pose labels $Y_{2d}$. For any given training sample, 3D pose prediction $\hat{Y}_{3d}$ is learnt using supervised learning when ground-truth $Y_{3d}$ is present and in an unsupervised manner from input $Y_{2d}$ when $Y_{3d}$ is not present. $Y_{2d}$ is also used for increasing the accuracy of 3D pose prediction, while ground-truth $Y_{3d}$ is present. The network architecture is illustrated in FIG. 4. The network consists of (i) 2D-to-3D pose regression module for predicting 3D pose $\hat{Y}_{3d}$ from given 2D pose Y2D and (ii) 3D-to-2D re-projection module for aligning the 2D re-projection $\hat{Y}_{2d}^{reproj}$ of predicted 3D pose $\hat{Y}_{3d}$ with input 2D pose $Y_{2d}$. For both the 2D-to-3D and 3D-to-2D network, 2D-to-3D pose regression is carried out using a deep feedforward neural network that learns to predict 3D pose from input 2D pose, using a fully supervised 3D loss, which is defined as, $$L_{3d} = \frac{1}{N} \sum_{i=1}^{N} (\hat{Y}_{3d} - Y_{3d})^2 \quad (1)$$

where, $\hat{Y}_{3d}$ is the 3D pose being predicted, $Y_{3d}$ is 3D ground truth pose, N is number of training samples. When training sample contains 3D ground-truth pose, the network of the present disclosure minimizes 3D supervised loss defined in Equation (1).

The predicted 3D pose is a valid and correct pose in 3D, only if it projects correctly to the input 2D pose. This re-projection error is minimized to constrain the predicted 3D pose. Re-projection loss ($L_{2d}$) is defined as:

$$L_{2d} = \frac{1}{N} \sum_{i=1}^{N} (\hat{Y}_{2d}^{reproj} - Y_{2d})^2 \quad (2)$$

Infinite number of 3D poses can be re-projected to a single 2D pose, but all of them may not be physically plausible human pose. Hence, the solution space is restricted to ensure plausibility in predicted 3D poses by introducing structural constraints on the bone lengths based on the prior knowledge from 3D annotated datasets. Geometric Constraints on 3D Human Poses:

Bone length symmetry loss: To ensure symmetry between contra-lateral segments of the human pose, bone length symmetry loss ($L_{3d}^{symm}$) has been applied on predicted limb lengths. Bone lengths between neck to shoulder and hip to pelvis, remain same for left and right segments of the body. This constraint was enforced on predicted 3D pose, using symmetry loss ($L_{3d}^{symm}$), which is defined as:

$$L_{3d}^{symm} = \frac{1}{N} \sum_{i}^{N} \left( \frac{1}{|Rs_i|} \sum_{e \in Rs_i} (B_e^l - B_e^r)^2 \right) \quad (2)$$

where, $Rs_i$ represents a set of skeleton segments {arm, leg, $neck_{shoulder}$, hip_elvis}. $B_e^l$ and $B_e^r$ are bone lengths of left and right side of each of the segments e. The total loss ($B_e^r$) minimized by the full network of the present disclosure is defined as:

$$L = \alpha L_{3d} + \beta L_{2d} + \gamma L_{3d}^{symm} \quad (4)$$

Here, $\alpha, \beta, \gamma \in (0, 1)$ are scalar values denoting the weightage of each loss term.

As mentioned above, FIG. 4 shows overall architecture for a network architecture as implemented by the system 100 of FIG. 3 in accordance with an embodiment of the present disclosure. Each module (e.g., the 2D-to-3D and 3D-to-2D network modules) consists of two residual blocks, where each residual block contains two linear layers, with batch normalization, dropout and ReLu activation, and a residual connection from initial to final layer of each block. In addition, the input and output of each module is connected to two fully connected layers that map the input dimension to the dimension of intermediate layers and back to output dimension respectively.

Figure 5:
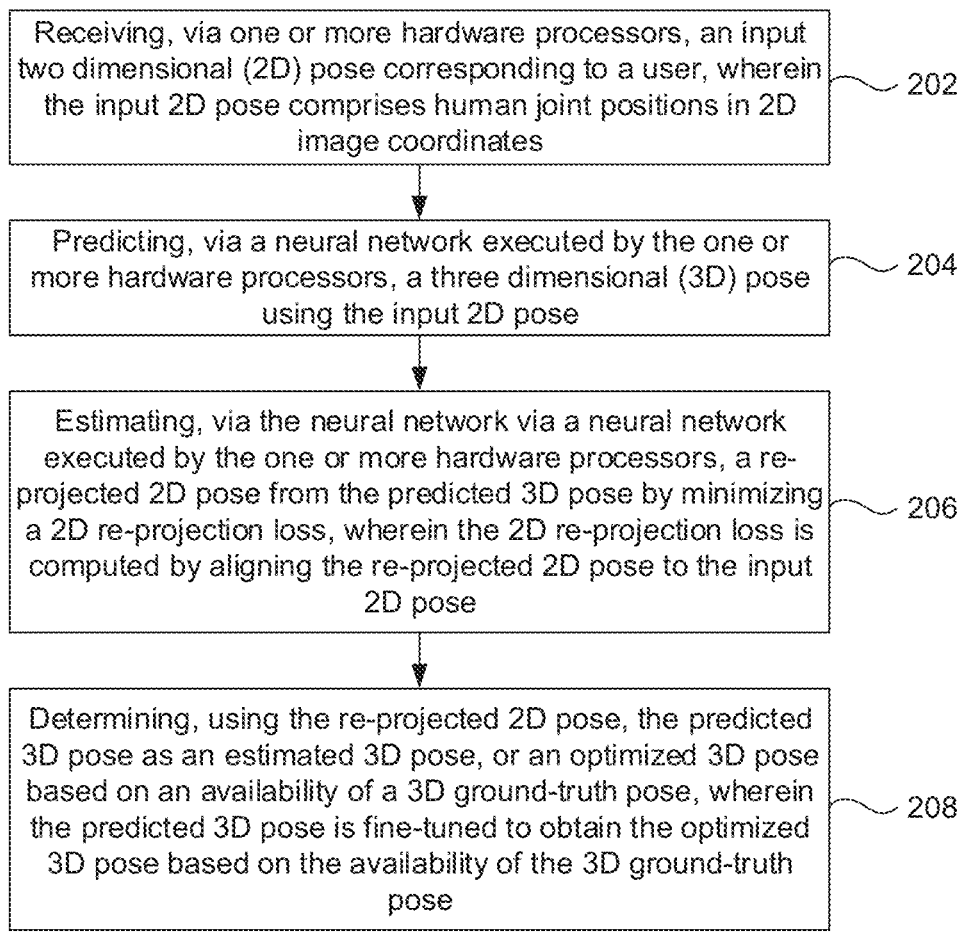
FIG. 5 is an exemplary flow diagram illustrating a method for weakly supervised learning of 3D human poses from 2D poses, in accordance with an embodiment of the present disclosure.

FIG. 5, with reference to FIGS. 3-4, is an exemplary flow diagram illustrating a method for weakly supervised learning of 3D human poses from 2D poses, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 3, the network architecture of FIG. 4 and the flow diagram as depicted in FIG. 5 and representations of FIGS. 6-8. In an embodiment of the present disclosure, at step 202, the one or more hardware processors 104 receive an input two dimensional (2D) pose ($Y_{2d}$) corresponding to a user, wherein the input 2D pose comprises human joint positions in 2D image coordinates. More specifically, the 2D- to 3D pose regression module of FIG. 4 receives an input two dimensional (2D) pose ($Y_{2d}$) corresponding to a user, wherein the input 2D pose comprises human joint positions in 2D image coordinates. In an embodiment of the present disclosure, at step 204, the 2D to 3D pose regression module which when executed by the one or more hardware processors 104 predicts a three dimensional (3D) pose ($\hat{Y}_{3d}$) using the input 2D pose ($Y_{2d}$), wherein the three dimensional (3D) pose ($\hat{Y}_{3d}$) comprises the human joint positions in a 3D space. In an embodiment, a 3D regression loss is computed by aligning the predicted 3D pose ($\hat{Y}_{3d}$) to the 3D ground truth pose.

The 3D regression loss acts as a closed feedback input in an iterative manner to improve (or fine-tune) the predicted 3D pose ($\hat{Y}_{3d}$). The fine-tuning may be achieved by minimizing the 3D regression loss, in one example embodiment.

In an embodiment, the three dimensional (3D) pose ($\hat{Y}_{3d}$) is predicted in a weakly-supervised learning framework using a dataset comprising samples with (a) 2D-3D ground-truth pose pairs and 2D ground-truth pose or (b) only 2D-3D ground-truth pose pairs. In one embodiment of the present disclosure, the weakly-supervised learning is performed on 2D poses to determine accuracy of learning 3D poses from 2D ground-truth pose obtained from images captured in one or more uncontrolled environments.

In an embodiment of the present disclosure, at step 206, the 3D to 2D pose re-projection module estimates a re-projected 2D pose ($\hat{Y}_{2d}^{reproj}$) from the predicted 3D pose ($\hat{Y}_{3d}$) by minimizing a 2D re-projection loss. The 2D re-projection loss is computed by aligning the re-projected 2D pose ($\hat{Y}_{2d}^{reproj}$) to the input 2D pose. The 2D re-projection loss acts as closed feedback input for estimating the re-projected 2D pose and improvising further to determine an accurate or near-accurate re-projected 2D pose.

In an embodiment of the present disclosure, at step 208, the one or more hardware processors 104 determine, using the re-projected 2D pose ($\hat{Y}_{2d}^{reproj}$), the predicted 3D pose ($\hat{Y}_{3d}$) as an estimated 3D pose, or an optimized 3D pose based on an availability of a 3D ground-truth pose $Y_{3d}$. In an embodiment, the predicted 3D pose is fine-tuned to obtain the optimized 3D pose based on the availability of the 3D ground-truth pose $Y_{3d}$.

Experimental Setup

Dataset Description Human3.6m is the largest publicly available 3D human pose benchmark dataset, with ground truth annotations captured with four RGB cameras and motion capture (MoCap) system. The dataset consisted of 3.6 million images featuring 11 professional actors (only 7 used in the experimental setup) performing 15 everyday activities such as walking, eating, sitting, discussing, taking photo etc. This dataset has both 2D and 3D joint locations along with camera parameters and body proportions for all the actors. Each pose has annotations for 32 joints. The present disclosure evaluates performance of the method of the present disclosure using standard protocol of evaluating Human3.6m, which uses actors 1, 5, 6, 7 and 8 for training and actors 9 and 11 for testing.

MPII is the benchmark dataset for 2D human pose estimation. The images were collected from short videos covering daily human activities with complex poses and variant image appearances. Poses are annotated by human with sixteen 2D joints. It contains 25,000 training images and 2957 validation images. Since the dataset has been collected randomly (not in controlled lab setup), it consists of large variety of poses. Hence, 3D pose estimation methods can use this data for better generalization to in-the-wild human poses.

MPI-INF-3DHP is a newly released 3D Human Pose dataset of 6 subjects performing 7 actions with indoor settings (background with a green screen (GS) and no green screen(NoGS)), captured with MoCap System and 14 RGB cameras and 2 subjects performing actions in outdoor settings in-the-wild. This makes a more challenging dataset than Human3.6M, which has data captured only in indoor settings. The systems and methods use MPIINF-3DHP dataset to test the generalization ability of model as described herein by the present disclosure to in-the-wild 3D poses. The testing split consists of 2935 valid frames.

Data Pre-Processing

While no augmentation was done for 2D poses and 3D poses of Human3.6m and MPI-INF-3DHP datasets, MPII was augmented for 35 times (rotation and scaling of 2D poses) for training, to increase the variability of poses in the full dataset. The present disclosure applied standard normalization (zero mean unit standard deviation) on 2D and 3D poses. The present disclosure further used root-centered 3D poses (skeleton with origin at pelvis joint) for 2D to 3D regression module. The present disclosure also used root-centering on 2D poses for 3D-to-2D re-projection module.

Training

The network architecture of FIG. 4, as implemented by the system 100 of FIG. 3, was trained in three consecutive phases. In the first phase, only 3D-to-2D regression module was trained with full supervision on 3D poses using the datasets with 3D annotated poses. In the second phase, a 2D-to-3D re-projection module was trained with the ground truth 3D poses to predict re-projected 2D pose. In the third phase, both pre-trained 3D-to-2D and 2D to 3D modules are fine-tuned simultaneously. During this final phase, 2D re-projection module was fine-tuned using predicted 3D pose. To understand the generalization ability of the network of FIG. 4, three variants of models were been trained: Model I, Trained on Human3.6m dataset, Model II, Model I fine-tuned on Human3.6m and MPII dataset and Model III, Model I fine-tuned on MPI-INF-3DHP dataset. Except Model II, all other models were trained with 3D supervised loss, 2D re-projection loss and bone-length symmetry loss. In Model II, for MPII dataset only unsupervised losses i.e., 2D re-projection loss and bone-length symmetry loss were used. Implementation details:

2D-to-3D regression and 3D-to-2D re-projection modules of Model I and III (MPI-INF-3DHP fine tuning) were pre-trained on ground truth poses separately for first 50 epochs. After pre-training, these modules are trained simultaneously for another 100 epochs with predicted 3D pose as input to 3D-to-2D re-projection module. For Model II (MPII fine tuning), both modules are fine-tuned simultaneously for 200 epochs using training samples from both Human 3.6M and MPII (1:1 ratio in a batch). For training samples from MPII, the value of was set to 0, since 3D supervision cannot be done. In all other cases, value of $\alpha, \beta$, and $\gamma$ were empirically set to 0.5, 0.5 and 1.0 respectively during end-to-end training of full network. Learning rate was 1e-4 and batch size was 64, during the training of all models.

Experimental Evaluation

For showing the efficacy and generalizing capability of the method of present disclosure, a quantitative performance analysis, on standard 3D human pose datasets- Human 3.6M and MPI-INF-3DHP and qualitative evaluation on 2D Human Pose dataset MPII have been presented.

Quantitative Results

Evaluation on test datasets was done using standard 3D pose estimation metrics, MPJE (Mean Per Joint Error in mm) for Human3.6m dataset, along with PCK (Percent of Correct Key-points) and AUC (Area Under the Curve) for MPI-INF-3DHP, which are more robust and stronger metrics in identifying the incorrect joint predictions. A threshold of 150 mm was chosen in calculation of PCK. In accordance with other conventional methods, the evaluation was done after aligning the 3D position of the root joint of predicted pose with the ground-truth 3D pose. For quantitative evaluation on MPIINF-3DHP, to account for the depth scale difference between datasets Human3.6m and MPI-INF-3DHP, the predicted 3D pose is re-targeted to the ground-truth "universal" skeleton of MPI-INF-3DHP. This was done by scaling the predicted skeleton using ground-truth bone lengths while preserving directions of bones, following standard practices known in the art. Moreover, the present disclosure also accounts for the difference in pelvis joint definitions between Human3.6m and MPI-INF-3DHP during evaluation of the model trained on Human3.6m+MPII while testing on MPI-INF-3DHP. The location of the predicted pelvis and hip joints were moved towards neck in a fixed ratio (0.2) before evaluation.

Human3.6m: Table 1 shows results on Human3.6m under defined protocol known in the art using Model I, which was trained on Human3.6m dataset under full supervision.

TABLE 1

| Method(s) | Direct | Discuss | Eating | Greet | Phone | Photo | Pose | Purch. |
|---|---|---|---|---|---|---|---|---|
| Prior art 1 | 54.8 | 60.7 | 58.2 | 71.4 | 62.0 | 53.8 | 55.6 | 75.2 |
| Prior art 2 | 44.8 | 50.4 | 44.7 | 49.0 | 52.9 | 61.4 | 43.5 | 45.5 |
| Prior art 3 | 51.5 | 58.9 | 50.4 | 57.0 | 62.1 | 65.4 | 49.8 | 52.7 |
| Prior art 4 | 49.2 | 57.5 | 53.9 | 55.4 | 62.2 | 73.9 | 52.1 | 60.9 |
| Prior art 5 | 42.1 | 44.3 | 45.0 | 45.4 | 51.5 | 43.2 | 41.3 | 59.3 |
| Prior art 6 | 37.7 | 44.4 | 40.3 | 42.1 | 48.2 | 54.9 | 44.4 | 42.1 |
| Method of present disclosure (ground-truth 2D pose labels) | 35.74 | 42.39 | 39.06 | 40.55 | 44.37 | 52.54 | 42.86 | 38.83 |

| Method(s) | Sitting | SittingD | Smoke | Wait | WalkD | Walk | WalkT | Avg. |
|---|---|---|---|---|---|---|---|---|
| Prior art 1 | 111.6 | 64.1 | 65.5 | 66.0 | 51.4 | 63.2 | 55.3 | 64.9 |
| Prior art 2 | 63.1 | 87.3 | 51.7 | 48.5 | 52.2 | 37.6 | 41.9 | 52.1 |
| Prior art 3 | 69.2 | 85.2 | 57.4 | 58.4 | 43.6 | 60.1 | 47.7 | 58.6 |
| Prior art 4 | 73.8 | 96.5 | 60.4 | 55.6 | 69.5 | 46.6 | 52.4 | 61.3 |
| Prior art 5 | 73.3 | 51.0 | 53.0 | 44.0 | 38.3 | 48.0 | 44.8 | 48.3 |
| Prior art 6 | 54.6 | 58.0 | 45.1 | 46.4 | 47.6 | 36.4 | 40.4 | 45.5 |
| Method of present disclosure (ground-truth 2D pose labels) | 53.08 | 53.90 | 42.10 | 43.36 | 43.92 | 33.31 | 36.54 | 42.84 |

As shown in Table 1, the present disclosure and its method achieve greater accuracy than the state-of-the-art methods on most of the actions including difficult actions such as Sitting, Greeting, etc. (referred as pose labels) in terms of MPJE (Mean Per Joint Error, mm). On an average an overall improvement of 6% over has been observed in the method of present disclosure in comparison to the state-of-the-art method, which is also trained on 2D pose ground-truth. This improvement in accuracy over can be attributed to the 3D-to-2D re-projection loss minimization and geometric constraints. The method of the present disclosure also outperform state-of-the-art method which was trained on the input images from both Human3.6m and MPII, using Model I of the present disclosure trained on Human3.6m alone.

MPI-INF-3DHP: For MPI-INF-3DHP dataset, quantitative evaluation was done using standard metrics PCK, AUC and MPJE as used in state-of-the-art methods. (a) Cross Dataset Evaluation: Table 2 shows evaluation results on MPI-INF-3DHP with the Model I of the present disclosure (trained on Human 3.6M) and Model II (trained on Human 3.6M+MPII).

TABLE 2

| | Training | PCK | | | | AUC |
|---|---|---|---|---|---|---|
| Method(s) | data | GS | NoGS | Outdoor | ALL | ALL |
| Prior art 1 | H36m | 45.6 | 45.1 | 14.4 | 37.7 | 20.9 |
| Prior art 6 | H36m | 62.8* | 58.5* | 62.2* | 62.2* | 27.7* |
| Prior art 7 | H36m | 70.8 | 62.3 | 58.5 | 64.7 | 31.7 |
| Prior art 4 | H36m | 71.3* | 59.4* | 65.7* | 65.6* | 33.2* |
| Prior art 3 | H36M + MPII | — | — | — | 69.0 | 32.0 |
| Prior art 1 | H36m + MPII | 71.1 | 64.7 | 72.7 | 69.2 | 32.5 |
| Method of present disclosure (Model I) | H36m | 66.9* | 63.0* | 67.4* | 65.8* | 31.2* |

TABLE 2-continued

| | Training | PCK | | | | AUC |
|---|---|---|---|---|---|---|
| Method(s) | data | GS | NoGS | Outdoor | ALL | ALL |
| Method of present disclosure (Model III) | H36m + MPII | 74.2* | 66.9* | 71.4* | 70.8* | 34.5* |

Above table 2 depicts results on MPI-INF-3DHP test-set by scene. Higher PCK (%) and AUC indicates better performance. '-' means values are not given in conventional research work. * denotes re-targeting of predicted 3D pose using ground truth limb length. The model of the present disclosure shows best performance among state-of-the-art methods while fine-tuned on MPII dataset. Table 2 shows PCK and AUC for all three different settings (GS, NoGS and Outdoor) for the 2929 testing images. On an average an improvement of 2.3% on PCK (with threshold of 150 mm) and 6.2% on AUC was seen over the best performing state-of-the-art method. This establishes the improved cross-dataset generalization of the method of the present disclosure when compared to the state-of-the-art methods.

(b) Results after Fine-tuning: Embodiments, systems and methods of the present disclosure also present a performance analysis of the Model III (Model I fine-tuned on MPI-INF-3DHP dataset) in Table 3.

TABLE 3

| Method | Training data | Walk PCK | Exercise PCK | Sit PCK | Reach PCK | Floor PCK | Sport PCK | Misc. PCK | Total PCK | AUC | MPJE |
|---|---|---|---|---|---|---|---|---|---|---|---|
| Prior art 7 | (MPII + LSP) H3.6M + 3DHPa | 86.6 | 75.3 | 74.8 | 73.7 | 52.2 | 82.1 | 77.5 | 75.7 | 39.3 | 117.6 |
| Prior art 8 | (MPII + LSP) H3.6M + 3DHPa | 87.7 | 77.4 | 74.7 | 72.9 | 51.3 | 83.3 | 80.1 | 76.6 | 40.4 | 124.7 |
| Prior art 2 | H3.6M + 3DHP | — | — | — | — | — | — | — | 76.7 | 39.1 | 103.8 |
| Prior art 4 | (MPII) H3.6M + 3DHP | 90.5* | 80.9* | 90.0* | 85.6* | 70.2* | 93.0* | 92.9* | 83.8* | 47.7* | 85.0* |
| Method of present disclosure | H3.6M + 3DHP | 97.3* | 93.0* | 92.3* | 95.3* | 86.4* | 94.6* | 94.3* | 85.4* | 55.8* | 71.40* |

More specifically, above table 3 shows Activity-wise performance on MPI-INF-3DHP test-set using standard metrics PCK (%), AUC and MPJE (mm). (MPII) means pre-trained on MPII dataset. 'a' denotes background augmentation in training data. '-' means values are not given in research work. * denotes the re-targeting of predicted 3D pose using ground truth limb length. Higher PCK, AUC and lower MPJE indicates better performance. The present disclosure and its method(s) have achieved significantly better performance than the state-of-the-art methods on all the actions in terms of all the metrics. More particularly, it shows comparative analysis of activity-wise performance of Model III with all recent state-of-the-art methods. It is observed that the method of the present disclosure achieved significantly better performance than the state-of-the-art on all the actions in terms of all the metrics. On an average the method of the present disclosure exceeded the best accuracy achieved by methods fully supervised on MPI-INF-3DHP by 2% on PCK, 17% on AUC and 16% on MPJE.

Qualitative Results

Figure 6:
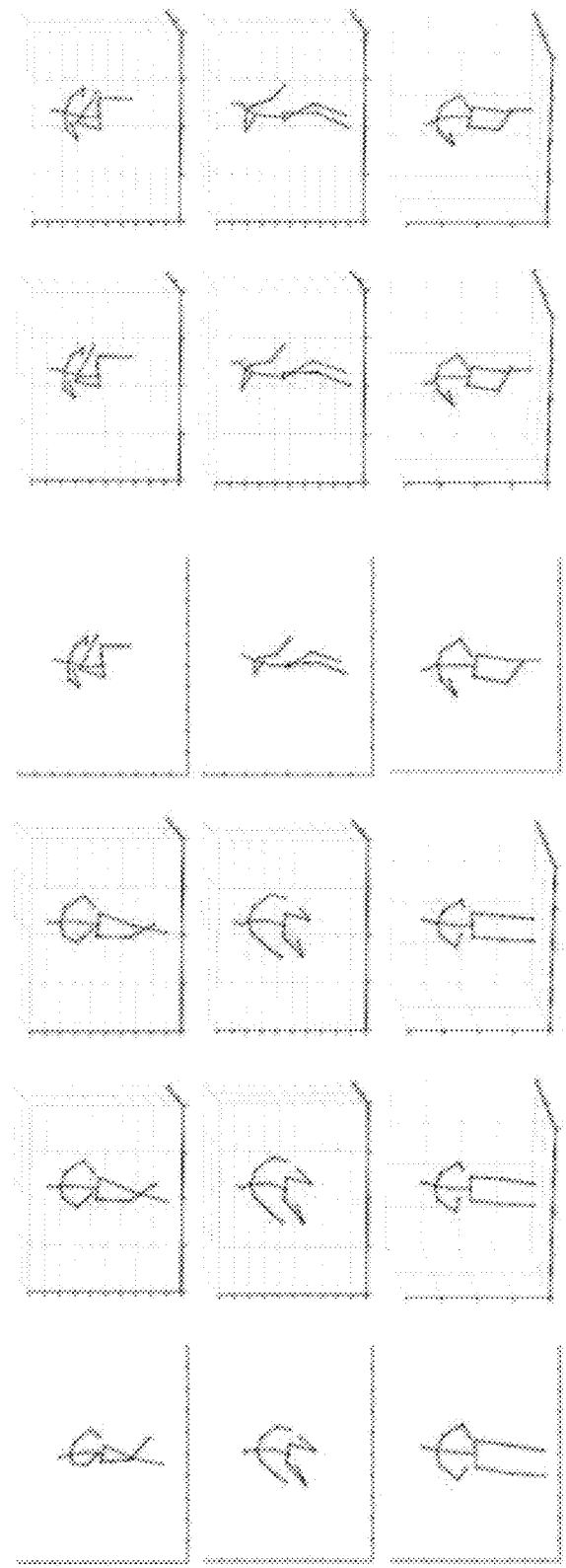
FIG. 6 depicts a qualitative evaluation of Model I on Human3.6m dataset in accordance with an embodiment of the present disclosure.
Figure 8:
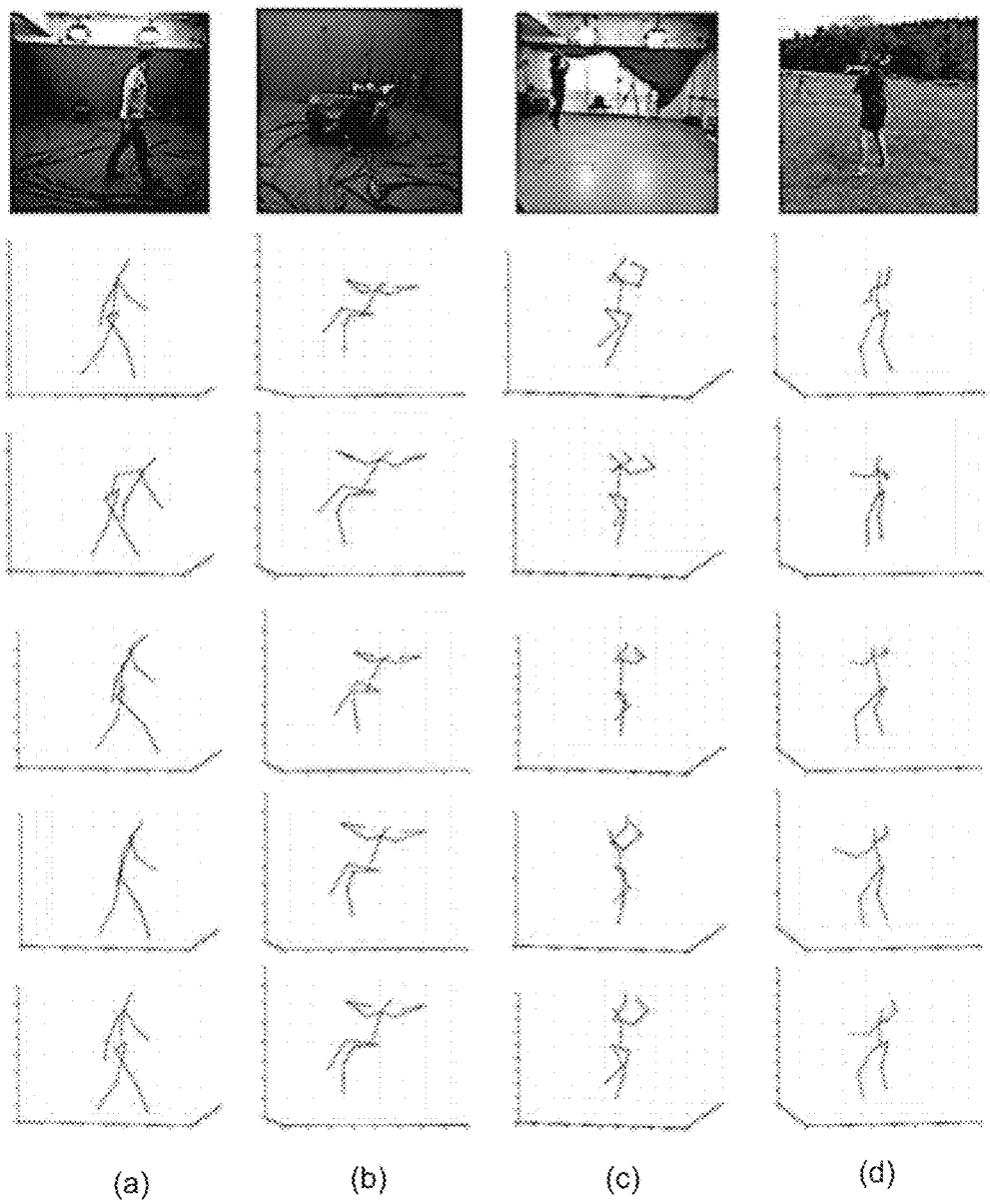
FIG. 8 depicts a qualitative evaluation on MPI-INF-3DHP dataset in accordance with an example embodiment of the present disclosure.
Figure 9:
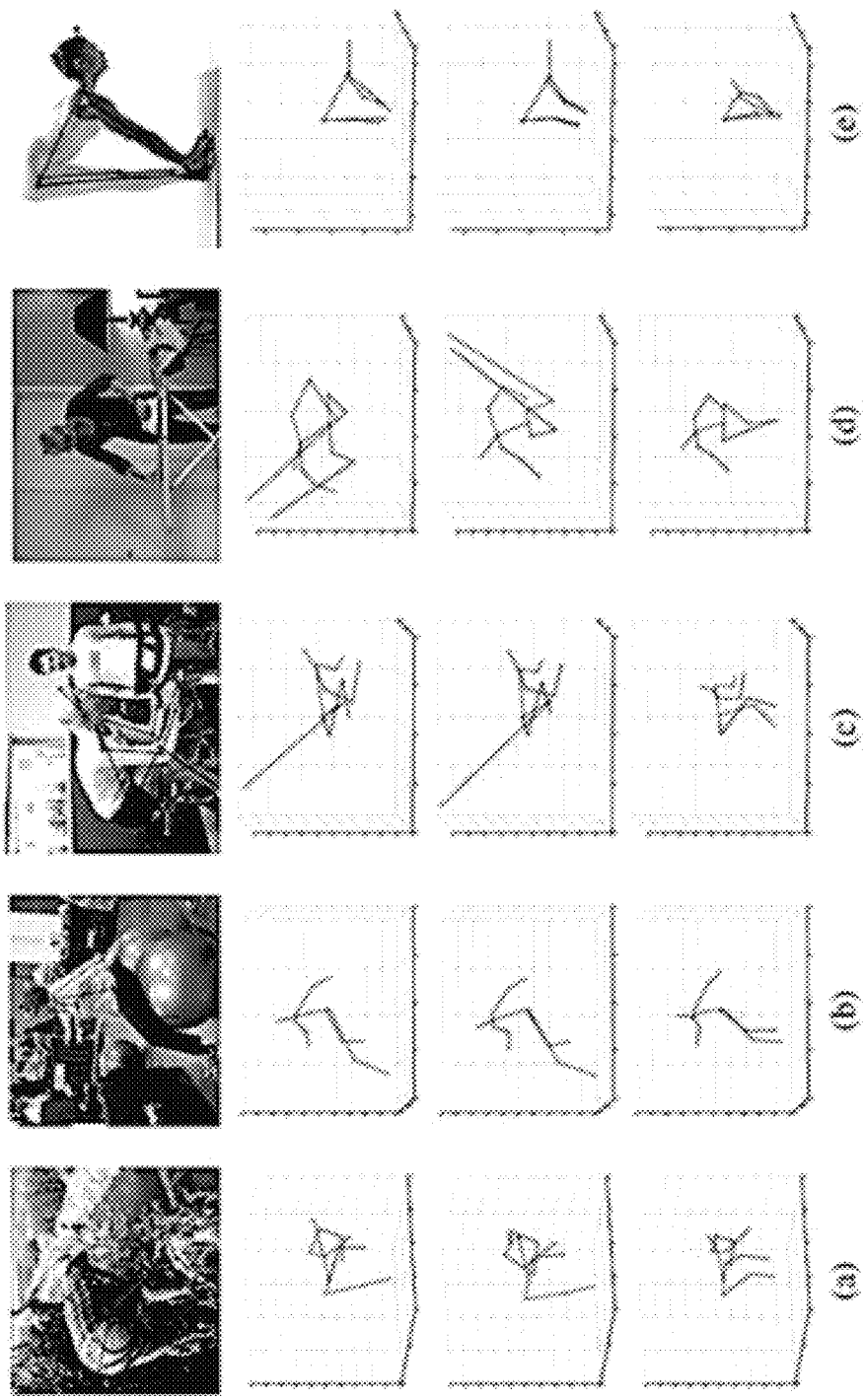
FIG. 9 depicts qualitative evaluation of models on MPII dataset in accordance with an example embodiment of the present disclosure.

The Qualitative results on Human3.6m, MPII and MPI-INF-3DHP are shown in FIGS. 6, 9 and 8 respectively. More specifically, FIG. 6, with reference to FIGS. 3 to 5, depicts Qualitative evaluation of Model I on Human3.6m dataset in accordance with an embodiment of the present disclosure. In FIG. 6, First and Fourth column: Input 2D poses. Second and Fifth column: Ground truth 3D poses. Third and Sixth column: 3D pose prediction using proposed Model I (model trained on Human3.6m with re-projection loss). The model of the present disclosure captures all the poses very accurately and performs better than the recent state-of-the-art methods. Quantitative results are given in Table 1.

FIG. 8, with reference to FIGS. 3 to 7, depicts a qualitative evaluation on MPI-INF-3DHP dataset in accordance with an example embodiment of the present disclosure. More specifically, in FIG. 8, First row: Input images with ground truth 2D pose. Second row: 3D ground truth poses. Third row: Prediction of the baseline network as known in the art, Fourth row: Prediction of proposed Model I (Model trained on Human3.6m dataset.), Fifth row: Prediction of proposed Model II (Model I fine-tuned on MPII dataset.), Sixth row: Prediction of Model III (Model I fine-tuned on MPI-INF-3DHP dataset). It can be observed that the baseline model fails to capture proper 3D pose in many cases, e.g., in (d) of FIG. 8 (or also referred as FIG. 8D), hands of the lady are predicted in a more downward position than that of the ground truth 3D pose. All variations of the model of the present disclosure can recover this pose using re-projection loss along with baseline supervised loss. Quantitative results are given in Table 2 and Table 3 depicted above.

FIG. 9, with reference to FIGS. 3 to 8, depicts qualitative evaluation of models on MPII dataset in accordance with an example embodiment of the present disclosure. More specifically, in FIG. 9, first row: Input images with ground 2D pose. Second row: 3D pose prediction of baseline architecture. Third row: 3D pose prediction of proposed Model I (trained on Human3.6m dataset). Fourth row: 3D pose prediction of proposed Model II (Model I fine-tuned on MPII dataset). A major drawback in the baseline network is, it cannot capture poses with occluded or invisible joints. In Figure (c), left foot joint of the person is not visible, hence 2D annotation for this joint is absent. The baseline model cannot predict 3D position for this joint, while the model of the present disclosure is fine-tuned on MPII dataset can predict position of this joint properly even from absent annotation. Similarly, in column (d) of FIG. 9, the model of the present disclosure can perfectly predict un-annotated joints.

Figure 7:
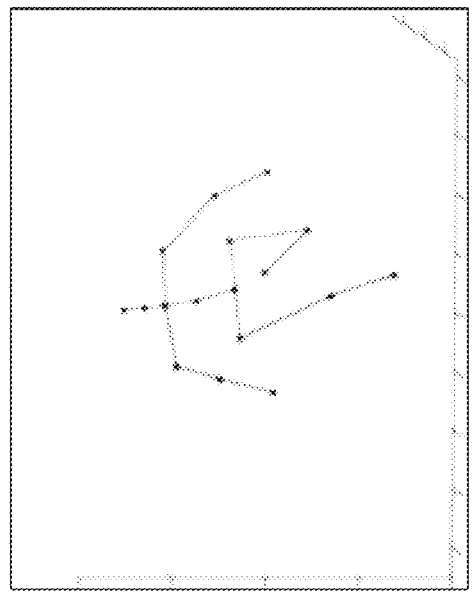
FIG. 7 depicts performance evaluation of the model of the system 100 of FIG. 3 on data captured in accordance with an example embodiment of the present disclosure.
Figure 7:
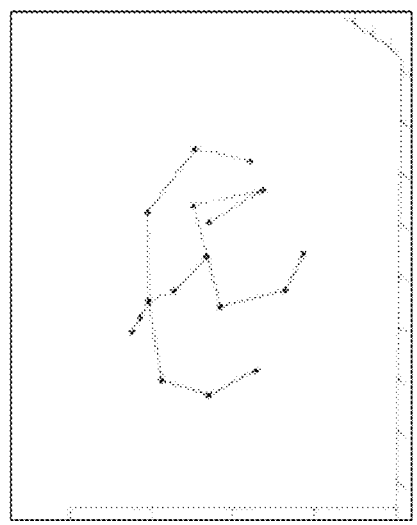
Figure 7:
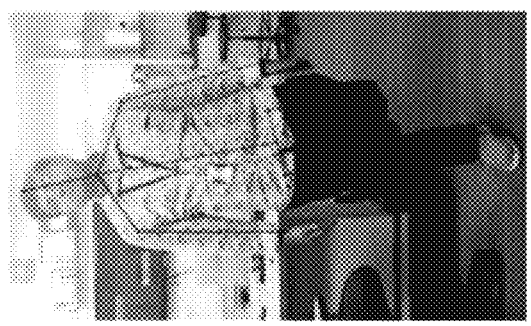

Evaluation on present disclosure's dataset: To further evaluate the generalization capability of the model of the present disclosure, the models were tested on present disclosure's dataset. A video data was collected using mobile camera in a lab environment. Stacked Hourglass network was used to estimate the 2D poses, which are given as input to the model of the present disclosure. FIG. 7 shows a sample image, corresponding predicted 3D pose from a baseline network and predicted 3D pose from the model of the present disclosure. FIG. 7, with reference to FIGS. 3 to 6, depicts performance evaluation of the model of the system 100 of FIG. 3 on data captured in accordance with an example embodiment of the present disclosure. In FIG. 7, Left: Input image with 2D pose (prediction of Stacked Hourglass network. Middle: Predicted 3D pose from baseline network. Right: Predicted 3D pose from the present disclosure's model (Model II). The baseline model fails to capture the proper angular positions of the legs and the overall pose appears to be bent forward. The fine-tuned model on MPII dataset (Model II) of the present disclosure shows significant improvement over the baseline model, on poses where joints are not visible. Hence, joint training of the network of FIG. 4 on 2D poses with occluded joints (partly annotated 2D pose) along with 3D ground truth enhances its ability of predicting occluded poses correctly. The model of the present disclosure gives better prediction (in terms of pose structure, angle between joints) of 3D pose compared to the baseline network.

Ablation Study

Table 4 and Table 5 shows ablative analysis of different network design parameters and losses used during training.

TABLE 4

| Method(s) | PCK | AUC |
|---|---|---|
| 2D-to-3D (supervised loss) Prior art 6 | 62.2 | 27.7 |
| 2D-to-3D + 3D-to-2D (re-projection loss) | 64.2 | 29.7 |
| 2D-to-3D + 3D-to-2D (re-projection loss + bone symmetry loss) Method of the present disclosure | 65.8 | 31.2 |

Table 4 shows, addition of 2D re-projection loss with supervised 3D loss in baseline network, increases PCK by around 3.2% and AUC by 7.2% on MPI-INF-3DHP dataset, during cross dataset validation. Using bone length symmetry loss with re-projection and supervised loss advances network performance further with 6% and 13% of improvement in PCK and AUC respectively for similar test-setup.

To understand optimality of performance of the 3D-to-2D module an ablation study has been performed on different choice of design parameters as depicted in Table 5.

TABLE 5

| Method(s) | Re-projection error | Δ |
|---|---|---|
| Without batch normalization | 36.2 | 30.7 |
| Without dropout | 6.49 | 0.99 |
| Without dropout + without normalization | 34.79 | 29.29 |

Table 5, represents error between input ground truth 2D and re-projected 2D from 3D-to-2D module for various design choices of network. This error is measured in terms of Euclidean distance between joints in 2D space. Re-projection error is quite high, when network is trained without batch normalization between intermediate layers or dropout. Hence, the 3D-to-2D module is also trained using batch normalization and dropout similar to 2D-to-3D module. Δ defines the re-projection error differences between current training setup and different choices of training setups as mentioned in Table 5.

A deep neural network was implemented by the systems and methods of the present disclosure for estimating 3D human pose from 2D pose that combines 2D pose data in the wild and 3D pose datasets captured in controlled environments in a weakly-supervised framework. The 3D-to-2D re-projection network of the present disclosure is necessary for generalization of 3D pose estimation as it learns to predict 3D poses from in-the wild 2D pose annotations. In other words, for both the 2D-to-3D and 3D-to-2D network, 2D-to-3D pose regression is carried out using a deep feedforward neural network that effectively learns to predict 3D pose from input 2D pose. The method of the present disclosure outperforms current state-of-the-art methods on a benchmark 3D dataset captured in controlled environments, as well as a challenging 3D dataset containing in the wild human poses. Along with benchmark datasets, the present disclosure also demonstrates the generalization ability of the method of the present disclosure on its own dataset.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, an input two dimensional (2D) pose ($Y_{2d}$) corresponding to a user, wherein the input 2D pose comprises human joint positions in 2D image coordinates;
predicting, via a neural network executed by the one or more hardware processors, a three dimensional (3D) pose ($\hat{Y}_{3d}$) using the input 2D pose ($Y_{2d}$), wherein the three dimensional (3D) pose ($\hat{Y}_{3d}$) comprises the human joint positions in a 3D space;
estimating, via the neural network via a neural network executed by the one or more hardware processors, a re-projected 2D pose ($\hat{Y}_{2d}^{reproj}$) from the predicted 3D pose ($\hat{Y}_{3d}$) by minimizing a 2D re-projection loss, wherein the 2D re-projection loss is computed by aligning the re-projected 2D pose ($\hat{Y}_{2d}^{reproj}$) to the input 2D pose; and
determining, using the re-projected 2D pose ($\hat{Y}_{2d}^{reproj}$), the predicted 3D pose ($\hat{Y}_{3d}$) as an estimated 3D pose, or an optimized 3D pose based on an availability of a 3D ground-truth pose $Y_{3d}$, wherein the predicted 3D pose is fine-tuned to obtain the optimized 3D pose based on the availability of the 3D ground-truth pose $Y_{3d}$.

2. The processor implemented method of claim 1, wherein the 3D pose ($\hat{Y}_{3d}$) is predicted in a weakly-supervised learning framework using a dataset comprising samples with 2D-3D ground-truth pose pairs.

3. The processor implemented method of claim 1, wherein the 3D pose ($\hat{Y}_{3d}$) is predicted in a weakly-supervised learning framework using a dataset comprising samples with (i) 2D-3D ground-truth pose pairs and (ii) 2D ground-truth pose.

4. The processor implemented method of claim 1, wherein a 3D regression loss is computed by aligning the predicted 3D pose ($\hat{Y}_{3d}$) to the 3D ground truth pose.

5. A system, comprising:
a memory storing instructions;
one or more communication interfaces; and
one or more hardware processors coupled to the memory via the one or more communication interfaces, wherein the one or more hardware processors are configured by the instructions to:
receive an input two dimensional (2D) pose ($Y_{2d}$) corresponding to a user, wherein the input 2D pose comprises human joint positions in 2D image coordinates;
predict, via a neural network comprised in the system, a three dimensional (3D) pose ($\hat{Y}_{3d}$) using the input 2D pose ($Y_{2d}$), wherein the three dimensional (3D) pose ($\hat{Y}_{3d}$) comprises the human joint positions in a 3D space;
estimate, via the neural network, a re-projected 2D pose ($\hat{Y}_{2d}^{reproj}$) from the predicted 3D pose ($\hat{Y}_{3d}$) by minimizing a 2D re-projection loss, wherein the 2D re-projection loss is computed by aligning the re-projected 2D pose ($\hat{Y}_{2d}^{reproj}$) to the input 2D pose; and
determine, using the re-projected 2D pose ($\hat{Y}_{2d}^{reproj}$), the predicted 3D pose ($\hat{Y}_{3d}$) as an estimated 3D pose, or an optimized 3D pose based on an availability of a 3D ground-truth pose $Y_{3d}$, wherein the predicted 3D pose is fine-tuned to obtain the optimized 3D pose based on the availability of the 3D ground-truth pose $Y_{3d}$.

6. The system of claim 5, wherein the 3D pose ($\hat{Y}_{3d}$) is predicted in a weakly-supervised learning framework using a dataset comprising samples with (i) 2D-3D ground-truth pose pairs and (ii) 2D ground-truth pose.

7. The system of claim 5, wherein the 3D pose ($\hat{Y}_{3d}$) is predicted in a weakly-supervised learning framework using a dataset comprising samples with 2D ground-truth pose.

8. The system of claim 5, wherein a 3D regression loss is computed by aligning the predicted 3D pose ($\hat{Y}_{3d}$) to the 3D ground truth pose.

9. One or more non-transitory machine readable information storage mediums comprising one or more instructions which when executed by one or more hardware processors cause weakly supervised learning of 3D human poses from 2D poses by:
receiving, via one or more hardware processors, an input two dimensional (2D) pose ($Y_{2d}$) corresponding to a user, wherein the input 2D pose comprises human joint positions in 2D image coordinates;
predicting, via a neural network executed by the one or more hardware processors, a three dimensional (3D) pose ($\hat{Y}_{3d}$) using the input 2D pose ($Y_{2d}$), wherein the three dimensional (3D) pose ($\hat{Y}_{3d}$) comprises the human joint positions in a 3D space;
estimating, via the neural network via a neural network executed by the one or more hardware processors, a re-projected 2D pose ($\hat{Y}_{2d}^{reproj}$) from the predicted 3D pose ($\hat{Y}_{3d}$) by minimizing a 2D re-projection loss, wherein the 2D re-projection loss is computed by aligning the re-projected 2D pose ($\hat{Y}_{2d}^{reproj}$) to the input 2D pose; and
determining, using the re-projected 2D pose ($\hat{Y}_{2d}^{reproj}$), the predicted 3D pose ($\hat{Y}_{3d}$) as an estimated 3D pose, or an optimized 3D pose based on an availability of a 3D ground-truth pose $Y_{3d}$, wherein the predicted 3D pose is fine-tuned to obtain the optimized 3D pose based on the availability of the 3D ground-truth pose $Y_{3d}$.

10. The one or more non-transitory machine readable information storage mediums of claim 9, wherein the 3D pose ($\hat{Y}_{3d}$) is predicted in a weakly-supervised learning framework using a dataset comprising samples with 2D-3D ground-truth pose pairs.

11. The one or more non-transitory machine readable information storage mediums of claim 9, wherein the 3D pose ($\hat{Y}_{3d}$) is predicted in a weakly-supervised learning framework using a dataset comprising samples with (i) 2D-3D ground-truth pose pairs and (ii) 2D ground-truth pose.

12. The one or more non-transitory machine readable information storage mediums of claim 9, wherein a 3D regression loss is computed by aligning the predicted 3D pose ($\hat{Y}_{3d}$) to the 3D ground truth pose.

* * * * *